US010435644B2

(12) United States Patent
Katsuta

(10) Patent No.: US 10,435,644 B2
(45) Date of Patent: Oct. 8, 2019

(54) TIRE BEAD LUBRICATING AGENT AND USE THEREOF

(71) Applicants: Masahiko Katsuta, Tokyo (JP); HAYAMI MACHINE TOOL CO., LTD, Tokyo (JP)

(72) Inventor: Masahiko Katsuta, Tokyo (JP)

(73) Assignees: Masahiko Katsuta, Tokyo (JP); HAYAMI MACHINE TOOL CO., LTD, Tokyo (JP)

( * ) Notice: Subject to any disclaimer, the term of this patent is extended or adjusted under 35 U.S.C. 154(b) by 106 days.

(21) Appl. No.: 15/557,367

(22) PCT Filed: Oct. 30, 2015

(86) PCT No.: PCT/JP2015/080646
§ 371 (c)(1),
(2) Date: Sep. 11, 2017

(87) PCT Pub. No.: WO2017/068733
PCT Pub. Date: Apr. 27, 2017

(65) Prior Publication Data
US 2018/0030371 A1    Feb. 1, 2018

(30) Foreign Application Priority Data
Oct. 19, 2015   (JP) .................................. 2015-205160

(51) Int. Cl.
*C10M 173/00*      (2006.01)
*B60C 15/02*       (2006.01)
(Continued)

(52) U.S. Cl.
CPC ........... *C10M 173/00* (2013.01); *B60C 15/02* (2013.01); *B60C 25/01* (2013.01);
(Continued)

(58) Field of Classification Search
CPC .................................................. C10M 173/00
See application file for complete search history.

(56) References Cited

U.S. PATENT DOCUMENTS 2,299,139 A    10/1942   Grafton
4,091,854 A *   5/1978   French .................... B60B 21/12
                                                              152/158
(Continued)

FOREIGN PATENT DOCUMENTS

CN      104017638 A     9/2014
JP      1-313596 A      12/1989
(Continued)

OTHER PUBLICATIONS

Office Action with Supplementary European Search Report dated Nov. 30, 2017 issued in corresponding European patent application No. 15906739.6.

(Continued)

*Primary Examiner* — Ellen M McAvoy
(74) *Attorney, Agent, or Firm* — FisherBroyles LLP; Louis Wagner

(57) ABSTRACT

The present invention relates to a lubricating agent for mounting or releasing a tire bead, comprising alkaline electrolyzed water and a lubricant component. The lubricant component comprises a lubricant base oil, which is made up of a mineral oil and/or a synthetic oil, and a surfactant. The present invention relates to a method for producing a lubricating agent for mounting or releasing a tire bead, the method comprising: mixing an alkaline electrolyzed water with a lubricant component. A tire and wheel assembly method, comprising: applying the above lubricating agent onto a contact surface of the wheel with a tire bead, and thereafter assembling the tire onto the wheel having had the lubricating agent applied thereon. A method for dismantling a tire and wheel integrated together, comprising: causing the (Continued)

above lubricating agent to seep onto a part of a contact surface of a wheel and a tire bead, and thereafter releasing the tire from the wheel. The provided is a lubricating agent for mounting or releasing a tire bead allows mounting a tire easily onto a wheel, at a bead seating pressure of 300 kPa or less; leaves little residual component after mounting; and enables easy releasing of a tire from a wheel. The present invention provides a tire and wheel assembly method and dismantling method in which the lubricating agent for mounting or releasing tire beads is utilized.

14 Claims, 1 Drawing Sheet

(51) Int. Cl.
*B60C 25/01* (2006.01)
*B60C 25/12* (2006.01)
*B60C 25/132* (2006.01)
*C10M 177/00* (2006.01)
*B60C 25/05* (2006.01)

(52) U.S. Cl.
CPC .......... *B60C 25/0596* (2013.01); *B60C 25/12* (2013.01); *B60C 25/132* (2013.01); *C10M 177/00* (2013.01); *C10M 2201/02* (2013.01); *C10M 2203/024* (2013.01); *C10M 2203/10* (2013.01); *C10M 2203/1006* (2013.01); *C10M 2205/028* (2013.01); *C10M 2205/0285* (2013.01); *C10M 2215/02* (2013.01); *C10M 2215/042* (2013.01); *C10N 2210/01* (2013.01); *C10N 2230/06* (2013.01); *C10N 2240/00* (2013.01); *C10N 2250/02* (2013.01); *C10N 2270/00* (2013.01)

(56) References Cited

U.S. PATENT DOCUMENTS

| | | | |
|---|---|---|---|
| 4,696,753 A * | 9/1987 | Umland | B60C 17/10 508/150 |
| 6,619,362 B2 | 9/2003 | Corghi | |
| 2002/0017368 A1 | 2/2002 | Corghi | |
| 2010/0119616 A1* | 5/2010 | Chen | A61K 33/00 424/600 |
| 2013/0020079 A1* | 1/2013 | Hopkins | C02F 1/4618 166/268 |
| 2014/0328949 A1* | 11/2014 | Adams | A01N 59/00 424/722 |
| 2017/0267553 A1* | 9/2017 | Gardner | C02F 1/4672 |

FOREIGN PATENT DOCUMENTS

| | | |
|---|---|---|
| JP | 01-313596 H | 12/1989 |
| JP | 2002-087034 A | 3/2002 |
| JP | 2002-87034 A | 3/2002 |
| JP | 2004-346239 A | 12/2004 |
| JP | 2006-272226 A | 10/2006 |
| JP | 2006-312735 A | 11/2006 |
| JP | 2008-080891 A | 4/2008 |
| JP | 2008-80891 A | 4/2008 |
| JP | 2008-207688 A | 9/2008 |
| JP | 2011-016431 A | 1/2011 |
| JP | 2011-16431 A | 1/2011 |
| JP | 2012-092205 A | 5/2012 |

OTHER PUBLICATIONS

International Search Report and Written Opinion (in Japanese) for PCT/JP2015/080646.
English Translation of International Search Report for PCT/JP2015/080646.
English Translation of Written Opinion for PCT/JP2015/080646.
Translation (English) and Original (Japanese) of the International Preliminary Report on Patentability Issued by the International Bureau of WIPO dated May 3, 2018 Including Written Opinion.
CN 104017638 Machine translation from Chinese to English by Patent Translate powered by EPO & Google as requested by the Office in the Interview Summary prepared by the Office dated Apr. 30, 2019.

* cited by examiner

Before driving
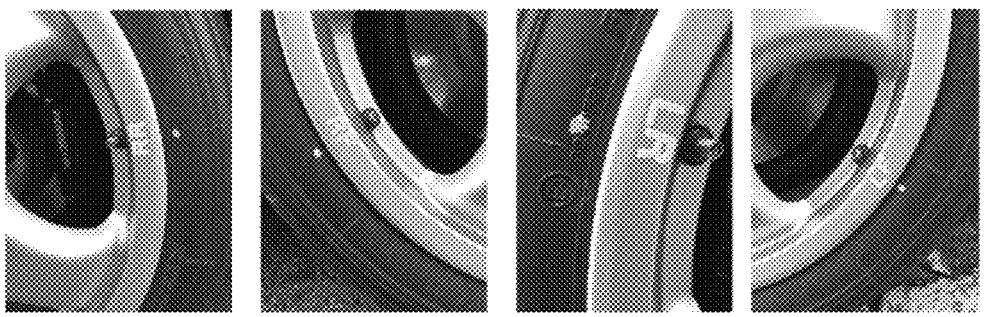
After qualification driving
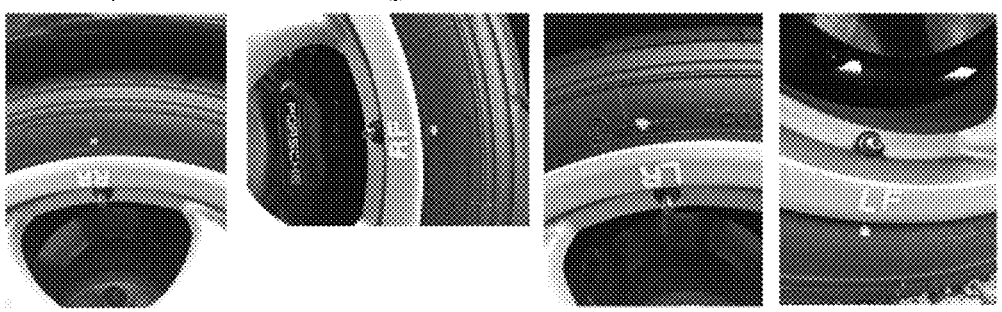
After final driving
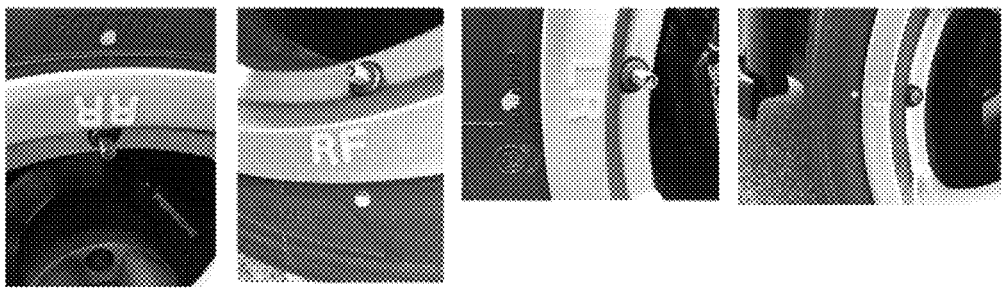

TIRE BEAD LUBRICATING AGENT AND USE THEREOF

CROSS-REFERENCE TO RELATED APPLICATIONS

The present invention is filed under 35 U.S.C. § 371 as the U.S. national phase of International Patent Application No. PCT/JP2015/080646, filed Oct. 30, 2015, which designated the United States and which claims the right of priority of Japanese Patent Application No. 2015-205160, filed on Oct. 19, 2015, the entire disclosure whereof is particularly incorporated herein by reference.

TECHNICAL FIELD

The present invention relates to a tire bead lubricating agent and to use thereof.

BACKGROUND ART

A lubricating agent is used in order to easily mount tire beads on a wheel when assembling a tire and a wheel. Assembly involves mounting and releasing (see, PTL 1 and 2). Conventionally used lubricating agents include solid types and water-soluble types. Solid types are often used for mounting, while water-soluble types are used only for releasing. Solid types do not penetrate readily between the wheel and the beads, and are not suitable for releasing.

Although sufficient lubricating performance is exhibited when water-soluble types for tire release are used, some residual lubricating agent remains on the tire and on the wheel after release from the wheel. The residual lubricating agent must be removed cleanly before the tire and wheel are used again.

To mount of the tire onto the wheel, bead seating pressure is applied with a view to promoting spontaneous mounting of the tire beads onto the wheel. In notifications pertaining to Occupational Health and Safety Regulations, the prescribed upper limit of the bead seating pressure is 300 kPa, with a view to securing operator safety.

For larger tire sizes, however, mounting of the tire onto the wheel at a bead seating pressure of 300 kPa is not easy even when using a lubricating agent of solid type, and in some instances mounting can be completed only by applying a bead seating pressure that exceeds 300 kPa. Also, the tire may in some cases be mounted to the wheel using lubricating agents having the property of being residually present after mounting, and which are generally not approved for use as a lubricating agent for tire beads. The former instance is undesirable in terms of securing operator safety, while the latter is undesirable from the viewpoint of safe driving of an automobile.

CITATION LIST

Patent Literature

PTL 1 Japanese Patent Application Publication No. 2008-207688
PTL 2 Japanese Patent Application Publication No. 2006-272226

The entire disclosures of PTL 1 and 2 are particularly incorporated herein by reference.

SUMMARY OF INVENTION

It is an object of the present invention to provide a lubricating agent for mounting or releasing tire beads such that the lubricating agent allows mounting a tire onto a wheel at a bead seating pressure of 300 kPa or less, and, after mounting, allows releasing the tire from the wheel while leaving little residual component and without damage to the beads, also in the case of large tires.

It is a further object of the present invention to provide a method for producing the lubricating agent for mounting or releasing tire beads, and a tire and wheel assembly method and dismantling method in which there is utilized the lubricating agent for mounting or releasing tire beads.

The present invention is as follows.

[1]
A lubricating agent for mounting or releasing a tire bead, containing alkaline electrolyzed water of pH 11.5 to 14 and a lubricant component.

[2]
The lubricating agent of [1], wherein the lubricant component comprises a lubricant base oil, which is made up of a mineral oil and/or a synthetic oil, and a surfactant.

[3]
The lubricating agent of [2], wherein the content of the lubricant base oil is in a range of 1 to 30 mass %, and the content of the surfactant is in a range of 0.001 to 5 mass %.

[4]
The lubricating agent of [2] or [3], wherein the surfactant is at least one type selected from among alkanolamines.

[5]
The lubricating agent of any one of [1] further comprising an additive.

[6]
The lubricating agent of [5], wherein the additive is an antioxidant of the lubricant base oil.

[7]
The lubricating agent of any one of [1] to [6], wherein the alkaline electrolyzed water contains sodium ions and/or potassium ions.

[8]
A method for producing a lubricating agent for mounting or releasing a tire bead, the method comprising: electrolyzing an aqueous solution of an alkali metal carbonate in a diaphragm electrolytic cell, to generate alkaline electrolyzed water on the cathode side, and then mixing the obtained alkaline electrolyzed water with a lubricant component.

[9]
A tire and wheel assembly method, comprising:
applying the lubricating agent of any one of [1] to [7] onto at least a contact surface of the wheel with a tire bead, and thereafter assembling the tire onto the wheel having had the lubricating agent applied thereon.

[10]
The method of [9], wherein a bead seating pressure onto the tire is set to 300 kPa or less.

[11]
A method for dismantling a tire and wheel integrated together, the method comprising:
causing the lubricating agent of any one of [1] to [7] to seep onto at least part of a contact surface of a wheel and a tire bead, and thereafter releasing the tire from the wheel.

BRIEF DESCRIPTION OF DRAWINGS

FIG. 1 is a set of photographs of positions of tire and wheels in Example 6.

ADVANTAGEOUS EFFECTS OF INVENTION

The present invention succeeds in providing a lubricating agent that allows mounting a tire easily onto a wheel, at a bead seating pressure of 300 kPa or less, from small tires to large tires. Using the lubricating agent of the present invention is advantageous in that not only are the tire beads mounted easily onto the wheel, but also in that there is improved balance uniformity in the mounted tire, by virtue of the fact that the tire beads are mounted easily onto the wheel. The lubricating agent of the present invention is further advantageous in that vibrations during running caused by non-uniformity in tire balance are reduced herein in a vehicle having attached thereto tires having been mounted on wheels using the lubricating agent of the present invention. The lubricating agent of the present invention is further advantageous in leaving little residual component after mounting; as a result, it becomes possible to avoid problems derived from residual lubricating agent during running of the mounted tires.

Further, the lubricating agent of the present invention allows releasing tires from wheels in an easy manner; as a result, it becomes possible to release tires from wheels without damage to the beads.

The present invention succeeds in providing a wheel-mounted tire that can contribute to securing operator safety, while enabling stable and safe running.

DESCRIPTION OF EMBODIMENTS

<Lubricating Agent>

The present invention relates to a lubricating agent for mounting or releasing tire beads, the lubricating agent comprising alkaline electrolyzed water at pH 11.5 to 14 and a lubricant component.

The lubricant component can contain a lubricant base oil made up of a mineral oil and/or a synthetic oil, and a surfactant.

(Lubricant Base Oil)

As the lubricant base oil there can be used a mineral oil or synthetic oil generally utilized as base oils for metalworking, or a mixture of the foregoing oils.

Various oils can be used as the mineral oils that can be utilized in the present invention. Examples thereof include for instance distillate oils obtained by atmospheric distillation of paraffinic crude oil, intermediate-base crude oil or naphthene-base crude oil or by reduced-pressure distillation of atmospheric-distillation residual oil; further, there can be used refined oils obtained by refining distillate oils in accordance with a common method, for instance solvent-refined oils, hydrorefined oils, dewaxed oils, and clay-treated oils.

Examples of the synthetic oils that can be used in the present invention include poly-α-olefins having 8 to 14 carbon atoms, olefin copolymers (such as ethylene-propylene copolymers), branched olefins such as polybutene and polypropylene as well as hydrogenated products thereof, ester compounds such as polyol esters (for instance fatty acid esters of trimethylolpropane and fatty acid esters of pentaerythritol), dibasic acid esters and alkylbenzenes.

The surfactant is added for the purpose of dispersing the lubricant base oil in the alkaline electrolyzed water. The surfactant is not particularly limited, and for instance there can be used at least one type selected from among alkanolamines.

The alkaline electrolyzed water is electrolyzed water of alkaline character, generated on the cathode side during electrolysis of an aqueous solution of an alkali metal salt. As the alkali metal salt there can be used salts of lithium, sodium, potassium or a mixture of the foregoing, preferably salts of sodium ions and/or potassium ions. As counter ions of the alkali ions there can be used herein for instance carbonate ions, since the influence thereof is comparatively small even when remaining in the alkaline electrolyzed water. Both a diaphragm electrolytic cell and a diaphragmless electrolytic cell may be used in electrolysis, but it is preferable to use a diaphragm electrolytic cell, in terms of curtailing the amount of impurities in the alkaline electrolyzed water. The alkaline electrolyzed water may be for instance an aqueous solution generated on the cathode side of a diaphragm electrolytic cell, through electrolysis of for instance potassium carbonate as the alkali metal salt.

In terms of the lubricating performance of the lubricating agent, the pH of the alkaline electrolyzed water is set to lie in the range of 11.5 to 14, preferably in the range of 12 to 13, more preferably in the range of 12.2 to 12.8, yet more preferably in the range of 12.3 to 12.7, and most preferably in the range of 12.4 to 12.6. The pH of the alkaline electrolyzed water can be adjusted as appropriate for instance on the basis of the concentration of alkali metal salt in the aqueous solution of an alkali metal salt, and on the basis of electrolysis conditions (mainly the electricity input per unit amount of the aqueous solution of an alkali metal salt).

The content of the lubricant base oil and of the surfactant in the lubricating agent of the present invention can be established as appropriate in accordance with the pH of the alkaline electrolyzed water and the types of the lubricant base oil and of the surfactant, while taking into consideration the desired lubricating performance. The content of the lubricant base oil lies for instance in the range of 1 to 30 mass %, preferably in the range of 5 to 25 mass %, and more preferably in the range of 10 to 25 mass %. The content of surfactant, which lies for instance in the range of 0.001 to 5 mass %, is adjusted as appropriate depending on the content of the lubricant base oil. The content of the alkaline electrolyzed water lies in the range of 10 to 80 mass %, preferably in the range of 20 to 70 mass %, and more preferably in the range of 25 to 60 mass %.

The lubricating agent of the present invention can further contain an additive.

Preferably, the lubricating agent contains an antioxidant, from the viewpoint of suppressing impairment of quality derived from oxidation during storage of the lubricating oil. As the antioxidant there can be used for instance (1) a chain reaction terminating agent: phenol-based antioxidants and amine-based antioxidants, (2) peroxide decomposition types: zinc dialkyl dithiophosphate (ZnDTP) and organo-sulfur type antioxidants, and (3) metal deactivators. Preferred herein are amine-based antioxidants. The content of antioxidant lies for instance in the range of 0.001 to 5 mass %.

Method for Producing the Lubricating Agent

The present invention encompasses a method for producing a lubricating agent for mounting or releasing tire beads. The method involves electrolyzing an aqueous solution of an alkali metal salt using a diaphragm electrolytic cell, to generate thereby alkaline electrolyzed water on the cathode side, and mixing then the obtained alkaline electrolyzed water with a lubricant component.

The type of the aqueous solution of an alkali metal salt is as described above, while the concentration of the alkali metal salt can be established as appropriate depending on the desired pH of the alkaline electrolyzed water and on electrolysis conditions.

A diaphragm electrolytic cell is used for electrolysis. Although a diaphragm-less electrolytic cell can be used herein, it is preferable to use a diaphragm (ion exchange membrane) electrolytic cell, from the viewpoint of the purity of the alkaline electrolyzed water that is obtained. The electrolysis conditions can be established as appropriate, with for instance the pH of the alkaline electrolyzed water in mind. For example, the concentration of potassium carbonate can be set to 1 to 20 mass %, and a diaphragm electrolytic cell can be used for electrolysis, with electrolysis conditions that include: DC applied voltage of 1 to 80 V, preferably 5 to 20 V, current density of 1 to 10 $A/dm^2$, and generation amount of 10 to 100 L/hour. The electrolysis conditions however are not meant to be limited to the foregoing ranges.

<Tire and Wheel Assembly Method>

The present invention encompasses a method for assembling a tire and a wheel. The method includes applying the lubricating agent of the present invention onto at least a contact surface of a wheel with a tire bead, and thereafter mounting the tire onto the wheel having had the lubricating agent of the present invention applied thereonto. A yardstick of the coating amount of the lubricating agent of the present invention lies in the range of 6 to 10 mL in the case of a 10-inch tire, 13 to 17 mL in the case of an 18-inch tire, and 20 to 24 mL in the case of a 26-inch tire. The coating amount is however not meant to be limited to the foregoing ranges. The method of the present invention allows bringing the bead seating pressure on the tire down to 300 kPa or less, and is accordingly advantageous in making it easier to secure the safety of the operator during assembly.

<Integrated Tire and Wheel Dismantling Method>

The present invention encompasses a method for dismantling a tire and a wheel that are integrated together. The method includes causing the lubricating agent of the present invention to seep onto at least part of the contact surface of a wheel and a tire bead, and thereafter releasing the tire from the wheel. A yardstick of the coating amount of the lubricating agent of the present invention upon release of the tire from the wheel may be for instance an amount in the range of 6 to 10 mL in the case of a 10-inch tire, 13 to 17 mL in the case of a 18-inch tire and 20 to 24 mL in the case of a 26-inch tire, similar to those during mounting of the tire onto the wheel. The coating amount is however not meant to be limited to the foregoing ranges.

EXAMPLES

The present invention will be explained in detail below on the basis of examples. The examples are however illustrative of the invention, and the latter is not meant to be limited to the examples.

Example 1

Preparation of a Lubricating Agent

Lubricating Agent A:

A lubricating agent A of the present invention was prepared by mixing 1% of diethanolamine, 5% of triethanolamine, 14% of an amine-based additive, 25% of a synthetic lubricating oil (polyolefin oil), and 5% of a mineral oil, with the balance (50%) of alkaline electrolyzed water (pH 12.5).

Lubricating Agent B:

A lubricating agent B of the present invention was prepared by mixing 5% of diethanolamine, 7% of triethanolamine, 26% of an amine-based additive, 27% of a synthetic lubricating oil, and 5% of a mineral oil, with the balance (30%) of alkaline electrolyzed water (pH 12.5).

Example 2

Tire and Wheel Assembly Method

Lubricating Agent A

A skilled assembly operator mounted a tire (Pirelli P ZERO NERO GT 195/45/16) onto a wheel (ASSO 7.0 JJ×16) using a lubricating agent of Example 1, with the help of an existing tire mounting device and mounting lever. The contact surface of the wheel and the tire beads was coated with 16 mL of lubricating agent A, and the tire was mounted onto the wheel coated with the lubricating agent. Mounting of one tire was completed in 51 seconds, without requiring extra bead breaking during the operation. The bead seating pressure onto the tire during mounting was 270 kPa, within the range of specified pressure (300 kPa).

Example 3

Tire and Wheel Assembly Method

A tire was mounted on a wheel in the same way as in Example 2, but using herein lubricating agent B instead of lubricating agent A. Mounting of one tire was completed in 50 seconds.

Comparative Example 1

Tire and Wheel Assembly Method

A skilled assembly operator mounted a tire onto a wheel in the same way as in Example 2, but using now a commercially available lubricating agent (TIP TOP, Universal Mounting Paste) for tire bead assembly, instead of lubricating agent A. Mounting of one tire required herein 66 seconds. Two bead breaking operations using the mounting lever were necessary in this case, due to insufficient lubrication, halfway during the operation. There was also a concern of damage to the wheel upon withdrawal of the lever in the final operation. The bead seating pressure onto the tire during mounting was 420 kPa, which exceeded the range of specified pressure (300 kPa).

Example 4

Integrated Tire and Wheel Dismantling Method

Herein 16 mL of lubricating agent A was caused to seep onto the contact surface of the wheel and the tire beads of a wheel with tire (tire (Yokohama ADVAN A050 245/40/17); wheel (Porsche cup type 9.0 JJ×17)), after which the tire was released from the wheel. A lever was used as the tool for releasing the tire from the wheel. Releasing one tire from the wheel took herein 79 seconds to complete. The operation involved simply lifting the lever using one hand, with the beads coming off quickly in a continuous turn, followed by simple pushing of the beads towards the rear, using one hand, to finish the operation. The beads of the released tire exhibited no damage.

Example 5

Integrated Tire and Wheel Dismantling Method

A tire was released from a wheel in the same way as in Example 4, but using herein lubricating agent B instead of lubricating agent A. Releasing one tire from the wheel took 80 seconds to complete. The beads of the released tire exhibited no damage.

Comparative Example 2

Tire and Wheel Assembly Method

A tire was released from a wheel in the same way as in Example 4, but using herein a commercially available lubricating agent for tire bead release (TIP TOP Universal Mounting Paste), instead of lubricating agent A. The test tire herein was an S tire, having a tough side wall. As a result, the bead could not be lifted in a simple manner using a tire bead cream, and both hands were required, with the physical effort put into the operation translating into a frowning face. The operation was carried out while rocking the lever left and right a number of times, as the bead failed to lift. Even with the bead lifted, there was a chance of damage to the bead, on account of the toughness of the side wall, and the operation involved intermittent turning. Due to insufficient lubrication, the operation of lifting the rear bead could not be carried out in a simple manner. The bead was nudged and released through the input of significant force using both hands. Release of one tire required herein 103 seconds. The beads of the released tire exhibited a plurality of damaged sites.

Example 6

Misalignment Test

Herein there was tested the deviation between wheel and tire during running of wheeled tires, having been assembled under conditions similar to those of Example 2.

Test vehicle: Porsche 964 Carrera 4, 1991 model;
Test tires: Yokohama ADVAN A050:
Tire size: F 225/45/17 and R245/40/17;

In the test, an automobile having the above four wheeled tires (RR, RF, LR, LF) mounted thereto took part in a car race (Tsukuba Circuit, Idlers Games), the positions of tires and the wheels were photographed before running, and then after running for 12 weeks of qualification and 11 weeks of finals. The photographs are depicted in FIG. 1. No deviation occurred after a total of 23 weeks of running in Tsukuba 2000.

Comparative Example 3

Misalignment Test

Herein there was tested the deviation between wheel and tire during running with wheeled tires having been assembled in Comparative example 1. In this case the degree of deviation was substantially identical to that of Example 6. Specifically, the lubricating agent of the present invention exhibited substantially the same deviation as that of a conventional commercially available lubricating agent for tire bead release.

INDUSTRIAL APPLICABILITY

The present invention is useful in the technical field pertaining to tire and wheel assemblies.

What is claimed is:

1. A lubricating agent for mounting or releasing a tire bead, consisting of alkaline electrolyzed water of pH 11.5 to 14 and a lubricant component,
    the lubricant component consisting of
        a lubricant base oil, which is made up of a mineral oil and/or a synthetic oil,
        an antioxidant of the lubricant base oil and
        a surfactant.

2. The lubricating agent of claim 1, wherein
    the content of the lubricant base oil is in a range of 1 to 30 mass %, and
    the content of the surfactant is in a range of 0.001 to 5 mass %.

3. The lubricating agent of claim 1, wherein the surfactant is at least one type selected from among alkanolamines.

4. The lubricating agent of any one of claim 1, wherein the alkaline electrolyzed water comprises sodium ions and/or potassium ions.

5. A method for producing a lubricating agent for mounting or releasing a tire bead, the lubricant agent comprising:
    alkaline electrolyzed water of pH 11.5 to 14, and
    a lubricant component consisting of
        a lubricant base oil which is made up of a mineral oil and/or a synthetic oil,
        an antioxidant of the lubricant base oil, and
        a surfactant;
    the method comprising:
        electrolyzing an aqueous solution of an alkali metal carbonate in a diaphragm electrolytic cell, to generate alkaline electrolyzed water on the cathode side, and then
        mixing the obtained alkaline electrolyzed water with a lubricant component.

6. A tire and wheel assembly method, comprising:
    applying the lubricating agent comprising:
        alkaline electrolyzed water of pH 11.5 to 14 and
        a lubricant component
    onto at least a contact surface of the wheel with a tire bead,
    allowing the lubricating agent to seep onto at least part of the contact surface of the wheel and a tire bead; and
    and thereafter assembling the tire onto the wheel.

7. The method of claim 6, wherein
    a bead seating pressure onto the tire is set to 300 kPa or less.

8. The method of claim 6, wherein the lubricant component comprises:
    a lubricant base oil which is made up of a mineral oil and/or a synthetic oil, and
    a surfactant.

9. The method of claim 8, wherein
    the content of the lubricant base oil is in a range of 1 to 30 mass %, and
    the content of the surfactant is in a range of 0.001 to 5 mass %.

10. The method of claim 8, wherein
    the surfactant is at least one type selected from among alkanolamines.

11. The method of claim 6, wherein
    the lubricating agent further comprises an additive.

12. The method of claim 11 wherein
    the additive is an antioxidant of the lubricant base oil.

13. The method of claim 6, wherein
    the alkaline electrolyzed water comprises sodium ions and/or potassium ions.

14. A method for dismantling a tire and wheel integrated together, the method comprising:
    causing the lubricating agent comprising
        alkaline electrolyzed water of pH 11.5 to 14 and
        a lubricant component;
    to seep onto at least part of a contact surface of a wheel and a tire bead, and thereafter releasing the tire from the wheel.

* * * * *